(12) United States Patent
Sasaki

(10) Patent No.: US 9,216,894 B2
(45) Date of Patent: Dec. 22, 2015

(54) DRINKING WATER SERVER

(75) Inventor: Satoshi Sasaki, Otsu (JP)

(73) Assignee: UCHIMURA CO., LTD., Fukuoka (JP)

( * ) Notice: Subject to any disclaimer, the term of this patent is extended or adjusted under 35 U.S.C. 154(b) by 377 days.

(21) Appl. No.: 13/981,684

(22) PCT Filed: Feb. 27, 2012

(86) PCT No.: PCT/JP2012/054737
§ 371 (c)(1),
(2), (4) Date: Jul. 25, 2013

(87) PCT Pub. No.: WO2012/118003
PCT Pub. Date: Sep. 7, 2012

(65) Prior Publication Data
US 2013/0306530 A1    Nov. 21, 2013

(30) Foreign Application Priority Data

Feb. 28, 2011    (JP) .................................. 2011-042993

(51) Int. Cl.
| | | |
|---|---|---|
| *B01D 35/00* | (2006.01) | |
| *B67D 7/76* | (2010.01) | |
| *C02F 1/00* | (2006.01) | |
| *B67D 3/00* | (2006.01) | |

(52) U.S. Cl.
CPC ............... *B67D 7/76* (2013.01); *B67D 3/0038* (2013.01); *C02F 1/003* (2013.01); *B67D 2210/0001* (2013.01)

(58) Field of Classification Search
None
See application file for complete search history.

(56) References Cited

U.S. PATENT DOCUMENTS

| | | | | |
|---|---|---|---|---|
| 5,405,526 A | * | 4/1995 | Sutera | ..................... B67D 3/00 210/124 |
| 5,676,278 A | * | 10/1997 | Beyer | ................... B67D 3/0032 222/185.1 |
| 6,202,541 B1 | * | 3/2001 | Cai | ..................... A47J 31/4485 210/282 |

FOREIGN PATENT DOCUMENTS

| | | |
|---|---|---|
| JP | 3110564 U | 6/2005 |
| JP | 2007-320586 A | 12/2007 |

OTHER PUBLICATIONS

Official Communication issued in International Patent Application No. PCT/JP2012/054737, mailed on Apr. 3, 2012.

* cited by examiner

*Primary Examiner* — Terry Cecil
(74) *Attorney, Agent, or Firm* — Keating & Bennett, LLP

(57) ABSTRACT

A drinking water server includes a raw water storage unit that stores raw water containing chlorine and a cover that defines an inner space of the raw water tank by blocking an upper opening of the raw water tank; a purification unit that receives and filters the raw water and discharges the filtered raw water as purified water into a purified water tank which stores or discharges purified water in response to closing or opening of the purified water discharge path; a drinking water storage unit in which a drinking water discharge path is provided and which stores or discharges purified water in response to closing or opening of the drinking water discharge path by a float valve body based on an amount of the purified water by floating on the purified water, an inner space of the drinking water tank (40) being closed; and an air tube portion that communicates between the raw water tank and the drinking water tank.

5 Claims, 2 Drawing Sheets

DRINKING WATER SERVER

BACKGROUND OF THE INVENTION

1. Field of the Invention

The present invention relates to a drinking water server and more specifically to a drinking water server that significantly reduces or prevents propagation of bacteria.

2. Description of the Related Art

Conventionally, in stores, workplaces, and the like, a drinking water server that provides drinking water such as cold water or hot water is installed on a floor, a table, or the like and used. Since bacteria may propagate in a tank or the like that stores drinking water, such a drinking water server is proposed to have means for suppressing propagation of bacteria.

For example, Japanese Utility Model Registration No. 3110564 discloses a hot and cold water dispenser (drinking water server) in which an antibacterial device is provided within a drinking water supply tube to suppress propagation of bacteria, and a plasma ion generating device is provided to purify air near a water feeding tap to reduce the bacteria themselves to suppress propagation of bacteria. Moreover, Japanese Utility Model Registration No. 3110564 discloses a water cooling and heating machine (drinking water server) in which hot and cold water is obtained from purified water that is obtained by purification means, hot water is mixed into cold water by a hot water backflow means to sterilize the cold water, in which bacteria are likely to propagate, to thereby suppress propagation of bacteria.

However, antibacterial measures such as the antibacterial device and the plasma ion generating device disclosed in Japanese Utility Model Registration No. 3110564 or the hot water backflow means disclosed in Japanese Utility Model Registration No. 3110564 may complicate the structure of the drinking water server.

SUMMARY OF THE INVENTION

Preferred embodiments of the present invention provide a drinking water server capable of significantly reducing or preventing propagation of bacteria with a simple structure.

A drinking water server according to a preferred embodiment of the present invention includes a raw water storage unit including a raw water tank that stores raw water containing chlorine and a cover that defines an inner space of the raw water tank by blocking an upper opening of the raw water tank; a purification unit including a purification cartridge that receives and filters the raw water and discharges the filtered raw water as purified water and a purified water tank in which a purified water discharge path is provided and which stores or discharges purified water flowing from the purification cartridge in response to closing or opening of the purified water discharge path; a drinking water storage unit including a drinking water tank in which a drinking water discharge path is provided and which stores or discharges purified water flowing from the purified water tank in response to closing or opening of the drinking water discharge path and a float valve body that closes or opens the purified water discharge path of the purified water tank according to the amount of the purified water by floating on the purified water stored in the drinking water tank, an inner space of the drinking water tank being closed; and an air tube portion that communicates between the inner space of the raw water tank and the inner space of the drinking water tank.

Preferably, in the drinking water server according to a preferred embodiment of the present invention, the air tube portion communicates with the inner space of the raw water tank with an air filter interposed therebetween.

Preferably, in the drinking water server according to a preferred embodiment of the present invention, the inner space of the purified water tank communicates with the inner space of the drinking water tank when purified water is not present therein.

Preferably, in the drinking water server according to a preferred embodiment of the present invention, the raw water tank, the purified water tank, and the drinking water tank are configured to be separated from one another, and the raw water tank has a shape that is symmetric or substantially symmetric about a line that extends in a direction perpendicular or substantially perpendicular to an axial direction of the raw water tank and passes through a center in a thickness direction of a partition wall.

Preferably, in the drinking water server according to a preferred embodiment of the present invention, the float valve body includes a lateral portion including at least a portion that approaches a side wall of the drinking water tank.

According to the drinking water server of according to a preferred embodiment of the present invention, chlorine contained in the raw water is removed by the purification cartridge, and the purified water is stored in the drinking water tank. Moreover, a portion of the chlorine contained in the raw water becomes gas, which enters into the closed inner space of the drinking water tank through the air tube portion to significantly reduce or prevent propagation of bacteria in the inner space of the drinking water tank. Thus, it is possible to significantly reduce or prevent propagation of bacteria with a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
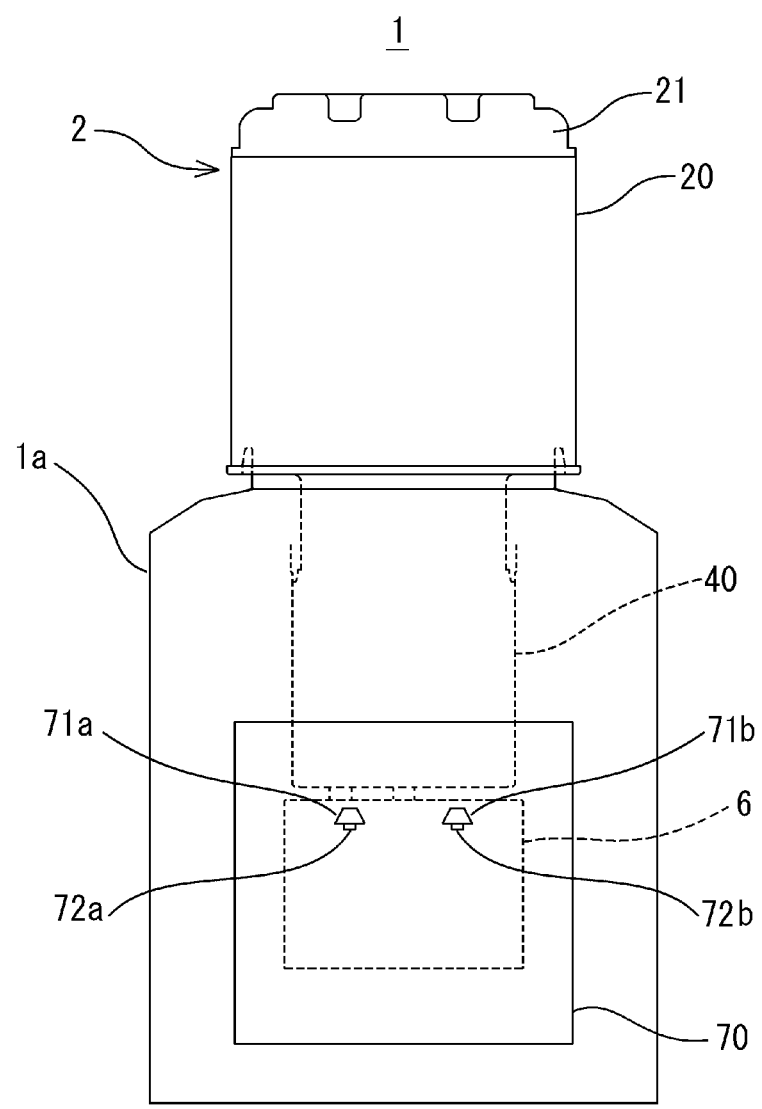
FIG. 1 is a front view showing an appearance of a drinking water server according to a preferred embodiment of the present invention.

Hereinafter, preferred embodiments of the present invention will be described with reference to the drawings. A drinking water server 1 according to a preferred embodiment of the present invention is preferably installed on a floor, a table, or the like, and as shown in FIG. 1, is preferably configured such that raw water is stored in a raw water storage unit 2, purified water is generated from the raw water, and the purified water is stored in a drinking water tank 40. The drinking water server 1 is arranged to control the temperature of the purified water in the drinking water tank 40 with the aid of a temperature controller 6 and is arranged to discharge hot or cold water serving as drinking water, which is purified water, from external outlets 72a and 72b into, for example, a cup or the like placed on the bottom of a recessed portion 70 by opening taps 71a and 71b that are provided in the recessed portion 70 of a housing 1a.

Figure 2:
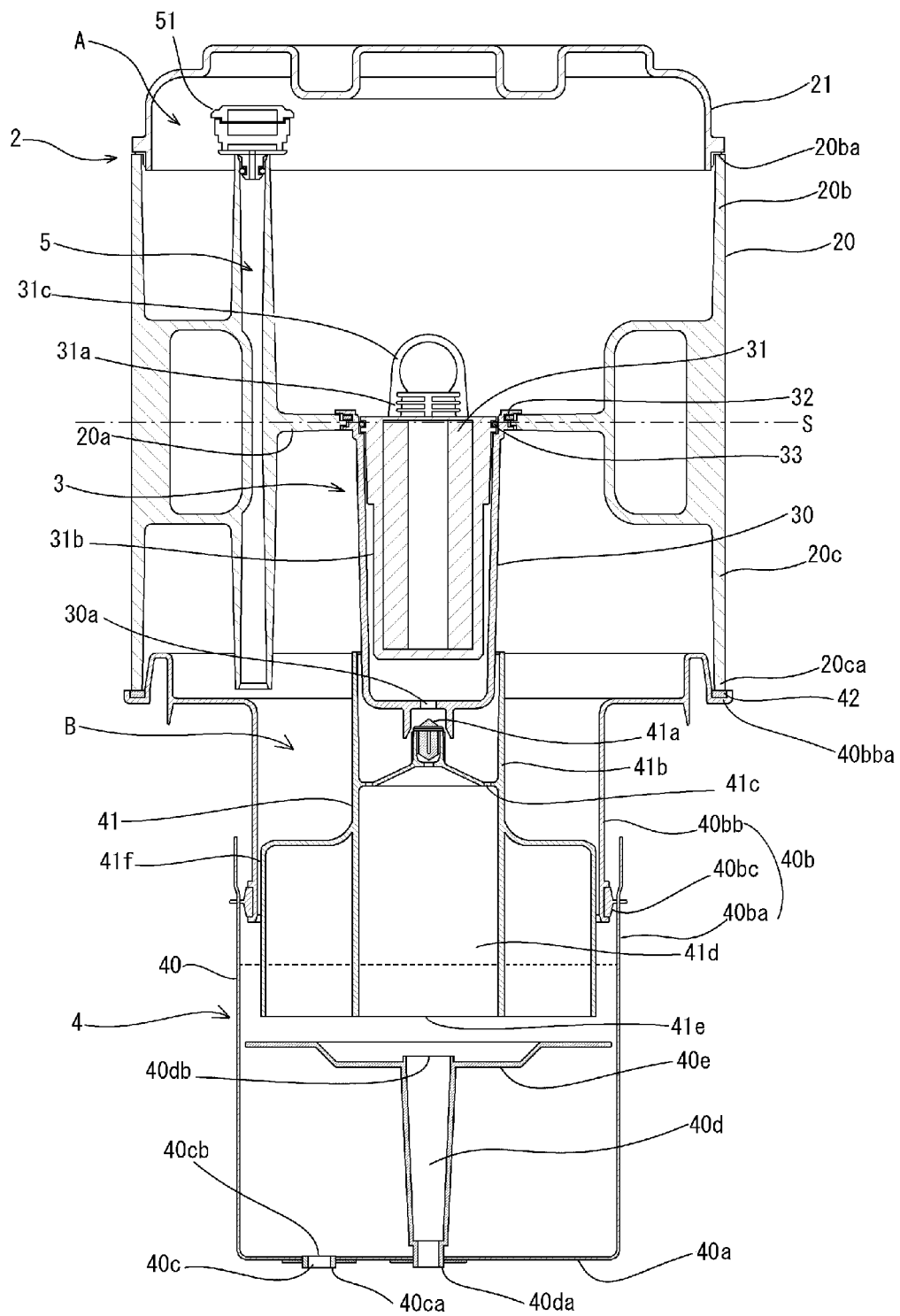
FIG. 2 is a schematic cross-sectional view showing a portion of the drinking water server at an enlarged scale.

FIG. 2 shows respective units of the drinking water server 1, used in the processes of generating purified water from raw water and storing the purified water in the drinking water tank 40. As shown in FIG. 2, the drinking water server preferably includes the raw water storage unit 2, a purification unit 3, a drinking water storage unit 4, and an air tube portion 5. The raw water contains chlorine, and tap water, chlorine-added mineral water, or the like is preferably used as the raw water.

The raw water storage unit 2 preferably includes a raw water tank 20 that stores raw water and a cover 21. The raw water tank 20 preferably has a cylindrical shape or an approximately cylindrical shape and preferably includes a partition wall 20a at an intermediate portion in an axial direction of the raw water tank 20. An upper side wall 20b and a lower side wall 20c are preferably continuously defined with the partition wall 20a as a single monolithic member, and the upper and lower sides of the partition wall 20a are open. A purified water tank 30 and a purification cartridge 31 (described later) are attached to a central portion of the partition wall 20a so as to pass through the partition wall 20a. The cover 21 preferably has an approximately bottomed cylindrical shape having a small axial length and defines an inner space A of the raw water tank 20 having a necessary volume together with the partition wall 20a and the upper side wall 20b by contacting an upper end 20ba of the upper side wall 20b so as to block the upper opening of the raw water tank 20. Since raw water is preferably stored in the inner space A of the raw water tank 20 up to such an extent that the level of the raw water does not exceed the upper end 20ba of the upper side wall 20b of the raw water tank 20, a portion of the chlorine contained in the raw water becomes gas and is collected above the raw water. Although it is preferable to close the inner space A of the raw water tank by allowing the raw water tank 20 to make close contact with the cover 21, a small gap may be provided as long as chlorine gas does not leak too much.

In the present preferred embodiment, the raw water tank 20 is preferably symmetric or substantially symmetric about a line S that extends in a direction perpendicular or substantially perpendicular to the axial direction of the raw water tank 20 and passes through the center in the thickness direction of the partition wall 20a. That is, the shape of the raw water tank 20 rotated by 180° in the vertical direction about the line S is preferably the same or substantially the same as the original shape.

The purification unit 3 includes the purified water tank 30 and the purification cartridge 31. The purified water tank 30 and the purification cartridge 31 are preferably attached to the partition wall 20a by passing through the central portion of the partition wall 20a. The purification cartridge 31 receives raw water from a raw water inlet 31a that faces the inner space A of the raw water tank 20, filters the raw water using a filtering material, and discharges the filtered raw water from a purified water outlet 31b as purified water. The purification cartridge 31 is removably attached, and a handle portion 31c provided to facilitate an attaching and removing operation is shown in the figure. The filtering material of the purification cartridge 31 is not particularly limited, and any of a hollow fiber membrane, a flat membrane, a ceramic membrane, an activated carbon molding filter, a multilayer filter, a wound filter, a metal filter, and the like can be used if so desired. The raw water entering into the purification cartridge 31 becomes purified water after the elapse of a predetermined period and falls due to gravity.

The purified water tank 30 is provided so as to surround the purified water outlet 31b of the purification cartridge 31. The purified water tank 30 includes a purified water discharge path 30a at the bottom portion of the purified water tank 30 and is configured to store purified water flowing from the purification cartridge 31 when the purified water discharge path 30a is closed and discharges the purified water when the purified water discharge path 30a is open. A majority portion of the purified water tank 30 (and the purification cartridge 31) is positioned in a space that is defined by the partition wall 20a and the lower side wall 20c of the raw water tank 20.

The purified water tank 30 is preferably closely attached to the partition wall 20a of the raw water tank 20 with a packing 32 interposed therebetween so that raw water does not leak into the drinking water tank 40. Similarly, the purified water tank 30 and the purification cartridge 31 are preferably closely attached with a packing (O-ring) 33 interposed therebetween so that raw water does not leak into the purified water tank 30.

The drinking water storage unit 4 preferably includes the drinking water tank 40 and a float valve body 41. The drinking water tank 40 stores purified water flowing from the purified water tank 30. The drinking water tank 40 includes a bottom portion 40a and a side wall 40b which are defined to be continuous to each other as a single monolithic member. More specifically, in the present preferred embodiment, the side wall 40b includes a side wall body 40ba, an upper side wall 40bb, and a side wall connecting portion 40bc that seamlessly connects both. The upper side wall 40bb preferably protrudes in a flanged shape in which an upper end side is bent outward at approximately 90° and a fitting portion 40bba is defined at the end of the upper side wall 40bb. A lower end 20ca of the lower side wall 20c of the raw water tank 20 is preferably fitted by making close contact with the fitting portion 40bba with a packing 42 interposed therebetween. In this manner, a closed space is defined by the raw water tank 20 and the drinking water tank 40, which defines an inner space B of the drinking water tank 40. The side wall 40b may alternatively be provided as a single member, for example.

The float valve body 41 is configured to close or open the purified water discharge path 30a of the purified water tank 30 according to the amount of purified water (indicated by a broken line in FIG. 2) by floating on the purified water stored in the drinking water tank 40. The float valve body 41 closes or opens the purified water discharge path 30a of the purified water tank 30 using a water stopping plug 41a that protrudes upward from the center of its upper portion.

The float valve body 41 preferably includes a cylindrical or substantially cylindrical guiding portion 41b that protrudes upward from the upper portion so as to surround the water stopping plug 41a, and the purified water tank 30 is inserted in the upper opening of the guiding portion 41b. The float valve body 41 preferably includes a water passage hole 41c that is arranged between the guiding portion 41b and the water stopping plug 41a, and a hollow portion 41d that communicates with the water passage hole 41c is arranged in the float valve body 41. The purified water flowing from the purified water tank 30 is discharged from a lower opening 41e of the hollow portion 41d while passing through the water passage hole 41c and the hollow portion 41d.

In the present preferred embodiment, the float valve body 41 preferably includes the lateral portion 41f having at least a portion that approaches the side wall 40b of the drinking water tank 40. At least a portion of the lateral portion 41f approaches in parallel or substantially in parallel to the side wall 40b and moves vertically along the side wall 40b according to the amount of purified water.

The drinking water tank 40 preferably includes two drinking water discharge paths 40c and 40d and is configured to store purified water when these paths are closed and discharge purified water when either of these paths is open. The drinking water discharge paths 40c and 40d are connected to the temperature controller 6 at respective bottom portions 40ca and 40da by pipes or the like and are closed or opened by the taps 71a and 71b provided in the recessed portion 70 of the housing 1a. In the present preferred embodiment, one drinking water discharge path 40c includes an inlet 40cb that is arranged near the bottom portion 40a of the drinking water tank 40. Moreover, a drain portion 40e that receives purified water falling through the hollow portion 41d of the float valve body 41 is preferably provided at a position higher than the bottom portion 40a of the drinking water tank 40, and an inlet 40db of the other drinking water discharge path 40d is defined in the drain portion 40e.

The air tube portion 5 is arranged in the vertical direction and communicates between the inner space A of the raw water tank and the inner space B of the drinking water tank. As described above, in the inner space A of the raw water tank 20, a portion of the chlorine contained in the raw water is collected above the raw water as chlorine gas. A portion of the collected chlorine enters into the inner space B, which is closed except for the lower end of the air tube portion 5, through the air tube portion 5. The upper end of the air tube portion 5 that communicates with the inner space A of the raw water tank 20 is preferably located on the upper side than the upper end 20ba of the upper side wall 20b of the raw water tank 20 so that the raw water stored in the raw water tank 20 does not flow into the air tube portion 5.

In the present preferred embodiment, although the air tube portion 5 is preferably provided to be integral with the raw water tank 20 as a single monolithic member, the air tube portion 5 may be defined separately from the raw water tank 20 and attached to the raw water tank 20, for example.

The air tube portion 5 preferably communicates with the inner space A of the raw water tank with an air filter 51 interposed therebetween, the air filter 51 being attached to the upper end of the air tube portion 5. The air filter 51 is configured to allow chlorine gas to pass and block dust or the like.

Due to the above-described configuration, in the drinking water server 1, purified water in which chlorine contained in raw water is removed by the purification cartridge 31 is stored in the drinking water tank 40, and in the inner space B of the drinking water tank 40, propagation of bacteria is significantly reduced or prevented by the chlorine contained in the raw water. As a result, the drinking water server 1 can provide cold and hot drinking water with few bacteria. Moreover, since the inner space of the purified water tank 30 generally communicates with the inner space B of the drinking water tank through the purified water discharge path 30a when purified water is not present in the purified water tank 30, propagation of bacteria is similarly significantly reduced or prevented.

When the raw water tank 20 has a shape that is symmetric or substantially symmetric about the line S that passes through the center in the thickness direction of the partition wall 20a in the above-described manner, raw water can preferably be stored in the inner space (a recess portion defined by the partition wall 20a and the upper side wall 20b) of the raw water tank 20. Moreover, when the raw water tank 20 and the drinking water tank 40 can be separated, raw water may be stored in the recess portion defined by the partition wall 20a and the lower side wall 20c by turning the server upside down. In this case, the purified water tank 30 is also separated, turned upside down, and is attached again. When the server is regularly turned upside down so that raw water is stored in a different recess portion, the portion that covers the upper side of the inner space B of the drinking water tank 40 can be automatically sterilized with chlorine in the raw water.

When at least a portion of the lateral portion 41f of the float valve body 41 is configured to approach the side wall 40b of the drinking water tank 40 in the above-described manner, even if bacteria enter into the inner space B of the drinking water tank 40 from the upper side to propagate toward the stored purified water, since the path that reaches the portion where the purified water is present is narrow, most of the bacteria will preferably be blocked at the upper surface of the float valve body 41. As a result, propagation of bacteria near the purified water is further significantly reduced or prevented.

While the drinking water server according to one preferred embodiment of the present invention has been described above, the present invention is not limited to those described in the above preferred embodiment, but various changes in design can be made. For example, although the drinking water tank 40 preferably includes two drinking water discharge paths 40c and 40d, the drinking water tank 40 may include only one drinking water discharge path. Moreover, the detailed shapes of the raw water storage unit 2, the purification unit 3, the drinking water storage unit 4, and the air tube portion 5 can be changed appropriately. For example, when it is desired to increase the amount of raw water that can be stored in the raw water tank 20, for example, the upper side wall 20b may have a larger length than the lower side wall 20c rather than defining the raw water tank 20 to have a shape that is symmetric about the line S that passes through the center in the thickness direction of the partition wall 20a. Further, the side wall 40b of the drinking water storage unit 4 may be extended up to the partition wall 20a of the raw water tank 20 so as to follow along the outer side of the air tube portion 5 to eliminate the lower side wall 20c as necessary. Furthermore, when it is not necessary to block bacteria at the upper surface of the float valve body 41, for example, the lateral portion 41f of the float valve body 41 may not be configured to approach the side wall 40b of the drinking water tank 40.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drinking water server comprising:
    a raw water storage unit including a raw water tank that stores raw water containing chlorine and a cover that defines an inner space of the raw water tank by blocking an upper opening of the raw water tank;
    a purification unit including a purification cartridge that receives and filters the raw water and discharges the filtered raw water as purified water and a purified water tank in which a purified water discharge path is provided and which stores or discharges purified water flowing from the purification cartridge in response to closing or opening of the purified water discharge path;
    a drinking water storage unit including a drinking water tank in which a drinking water discharge path is provided and which stores or discharges purified water flowing from the purified water tank in response to closing or opening of the drinking water discharge path and a float valve body that closes or opens the purified water discharge path of the purified water tank based on an amount of the purified water by floating on the purified water stored in the drinking water tank, an inner space of the drinking water tank being closed; and
    an air tube portion that communicates between the inner space of the raw water tank and the inner space of the drinking water tank.

2. The drinking water server according to claim 1, wherein the air tube portion communicates with the inner space of the raw water tank with an air filter interposed therebetween.

3. The drinking water server according to claim 1, wherein the inner space of the purified water tank communicates with the inner space of the drinking water tank when purified water is not present therein.

4. The drinking water server according to claim 1, wherein the raw water tank, the purified water tank, and the drinking water tank are separated from one another, and the raw water tank has a shape that is symmetric or substantially symmetric about a line that extends in a direction perpendicular or substantially perpendicular to an axial direction of the raw water tank and passes through a center in a thickness direction of a partition wall.

5. The drinking water server according to claim 1, wherein the float valve body includes a lateral portion including at least a portion that approaches a side wall of the drinking water tank.

* * * * *